United States Patent
Stephens

(10) Patent No.: US 8,701,095 B2
(45) Date of Patent: Apr. 15, 2014

(54) ADD/REMOVE MEMORY PRESSURE PER OBJECT

(75) Inventor: Maoni Z Stephens, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1397 days.

(21) Appl. No.: 11/188,395

(22) Filed: Jul. 25, 2005

(65) Prior Publication Data

US 2007/0022268 A1   Jan. 25, 2007

(51) Int. Cl.
*G06F 9/44* (2006.01)
*G06F 12/00* (2006.01)

(52) U.S. Cl.
USPC .......................................... 717/130; 707/813

(58) Field of Classification Search
USPC .................. 717/130, 140–161; 711/170, 171; 707/206, 813
See application file for complete search history.

(56) References Cited

U.S. PATENT DOCUMENTS

| | | | |
|---|---|---|---|
| 5,946,487 A * | 8/1999 | Dangelo | 717/148 |
| 5,948,113 A * | 9/1999 | Johnson et al. | 714/38 |
| 5,999,732 A * | 12/1999 | Bak et al. | 717/148 |
| 6,065,020 A * | 5/2000 | Dussud | 1/1 |
| 6,300,962 B1 | 10/2001 | Wishoff et al. | |
| 6,502,109 B1 | 12/2002 | Aravamudan et al. | |
| 6,629,113 B1 | 9/2003 | Lawrence | |
| 6,718,371 B1 | 4/2004 | Lowry et al. | |
| 6,854,046 B1 | 2/2005 | Evans | |
| 6,883,172 B1 * | 4/2005 | Angeline et al. | 719/315 |
| 7,100,015 B1 * | 8/2006 | Mathiske et al. | 711/170 |
| 7,139,894 B1 | 11/2006 | Mensching | |
| 7,162,605 B2 * | 1/2007 | Achanta et al. | 711/170 |
| 7,174,354 B2 | 2/2007 | Andreasson | |
| 7,406,699 B2 | 7/2008 | Liu | |
| 7,603,488 B1 | 10/2009 | Gravenstein | |
| 7,707,232 B2 * | 4/2010 | Dussud et al. | 707/819 |
| 7,730,465 B2 * | 6/2010 | Sutter et al. | 717/141 |
| 2003/0212719 A1 | 11/2003 | Yasuda et al. | |
| 2003/0225917 A1 | 12/2003 | Partamian et al. | |
| 2003/0236961 A1 | 12/2003 | Qiu et al. | |
| 2004/0003388 A1 | 1/2004 | Jacquemot et al. | |
| 2004/0060041 A1 * | 3/2004 | Demsey et al. | 717/151 |
| 2004/0064830 A1 | 4/2004 | Irving | |
| 2004/0073764 A1 | 4/2004 | Andreasson | |

(Continued)

OTHER PUBLICATIONS

Darwen ("Converting Between Native and Managed Types", Aug. 30, 2004, url:http://www.codeguru.com/cpp/cpp/cpp_managed/moving/print.php/c8031/Converting-Betw).*

(Continued)

*Primary Examiner* — Li B Zhen
*Assistant Examiner* — Hang Pan
(74) *Attorney, Agent, or Firm* — Kevin Sullivan; Kate Drakos; Micky Minhas

(57) ABSTRACT

Based on a requested allocation of a managed object, a native memory required with the managed object is determined. A portion of native memory is allocated and a portion of managed memory is allocated based on requirements of the managed object. A memory management strategy is implemented based on the allocation of native memory and unmanaged memory. For example, the memory management strategy can comprise garbage collection of first managed objects that have only managed heap associated therewith is performed before garbage collection of second managed objects that have both managed heap and native memory associated therewith.

13 Claims, 4 Drawing Sheets

(56) References Cited

U.S. PATENT DOCUMENTS

| | | | |
|---|---|---|---|
| 2004/0098724 A1* | 5/2004 | Demsey et al. | 718/104 |
| 2004/0158589 A1 | 8/2004 | Liang et al. | |
| 2004/0199927 A1 | 10/2004 | Liu et al. | |
| 2004/0216130 A1 | 10/2004 | Keller et al. | |
| 2004/0237064 A1 | 11/2004 | Liu | |
| 2004/0255267 A1* | 12/2004 | Meijer | 717/106 |
| 2005/0222969 A1 | 10/2005 | Yip et al. | |
| 2005/0223189 A1 | 10/2005 | Khan | |
| 2005/0268049 A1 | 12/2005 | De Lange | |
| 2006/0085494 A1 | 4/2006 | Dussud | |
| 2006/0101314 A1 | 5/2006 | Husbands et al. | |
| 2006/0101439 A1 | 5/2006 | Massarenti | |
| 2006/0143421 A1 | 6/2006 | Subramoney | |
| 2006/0230387 A1 | 10/2006 | Prakriya | |
| 2006/0265438 A1 | 11/2006 | Shankar | |
| 2007/0011658 A1 | 1/2007 | Stephens | |
| 2007/0094671 A1 | 4/2007 | Stephens | |
| 2008/0281885 A1 | 11/2008 | Dussud | |
| 2009/0307292 A1 | 12/2009 | Li | |
| 2010/0011357 A1 | 1/2010 | Ramamurthy | |
| 2010/0287217 A1 | 11/2010 | Borchers | |

OTHER PUBLICATIONS

Whaley (Joeq: A Virtual Machine and Compiler Infrastructure, in Proc. Workshop Interpreters, Virtual Machines, and Emulators, Jun. 2003).*
Microsoft Computer Dictionary, Copyright 1999, Fourth Edition, p. 28.
Non-Final Rejection, U.S. Appl. No. 10/969,301, dated Mar. 9, 2007, 10 pages.
Response to Non-Final Rejection, U.S. Appl. No. 10/969,301, dated Jun. 11, 2007, 12 pages.
Final Rejection, U.S. Appl. No. 10/969,301, dated Sep. 25, 2007, 10 pages.
Notice of Appeal Filed, U.S. Appl. No. 10/969,301, dated Feb. 25, 2008, 1 page.
Appeal Brief Filed, U.S. Appl. No. 10/969,301, dated Jun. 25, 2008, 22 pages.
Examiner's Answer to Appeal Brief, Application No. 10/969,301, dated Sep. 18, 2008, 24 pages.
Reply Brief Filed, U.S. Appl. No. 10/969,301, dated Nov. 18, 2008, 6 pages.
BPAI Decision—Examiner Reversed, U.S. Appl. No. 10/969,301, dated Mar. 24, 2010, 10 pages.
Notice of Allowance and Fees Due, U.S. Appl. No. 10/969,301, dated Aug. 3, 2010, 6 pages.
U.S. Appl. No. 11/099,841, Office Action mailed Sep. 17, 2008, 16 pages.
U.S. Appl. No. 11/099,841, Amendment filed Dec. 16, 2008, 18 pages.
U.S. Appl. No. 11/099,841, Office Action mailed Mar. 20, 2009, 16 pages.
U.S. Appl. No. 11/099,841, Amendment filed Jun. 19, 2009, 12 pages.
U.S. Appl. No. 11/099,841, Final Office Action mailed Oct. 28, 2009, 24 pages.
U.S. Appl. No. 11/099,84, Amendment filed Jan. 11, 2010, 12 pages.
U.S. Appl. No. 11/099,841, Office Action mailed Jun. 9, 2010, 20 pages.
U.S. Appl. No. 11/099,841, Amendment filed Sep. 7, 2010, 13 pages.
U.S. Appl. No. 11/099,841, Final Office Action mailed Dec. 2, 2010, 27 pages.
U.S. Appl. No. 11/099,841, Amendment filed Feb. 24, 2011, 13 pages.
U.S. Appl. No. 11/099,841, Office Action mailed Dec. 22, 2011, 18 pages.
U.S. Appl. No. 11/099,841, Amendment filed Mar. 7, 2012, 12 pages.
Emmanuel Schanzer, "Performance Considerations for Run-Time Technologies in the .NET Framework", Aug. 2001, Microsoft Corporation, pp. 1-23.
S. Vikram, "Code Optimization: Memory Management in .NET, part 2", Dec. 19, 2003, TechRepublic—A ZDNet Tech Community, pp. 1-4.
Steven Pratschner, "Microsoft .NET: Implement a Custom Common Language Runtime Host for Your Managed App", the Mar. 2001 Issue of MSDN Magazine, pp. 1-8.
U.S. Appl. No. 11/099,841, Final Office Action dated Dec. 5, 2012, 22 pages.
U.S. Appl. No. 11/099,841, Amendment After Final Office Action dated Feb. 13, 2013, 12 pages.
U.S. Appl. No. 11/099,841, Office Action mailed May 24, 2012, 20 pages.
U.S. Appl. No. 11/099,841, Amendment filed Aug. 24, 2012, 11 pages.
Sunil Soman et al., "Dynamic Selection of Application-Specific Garbage Collectors", Oct. 24-25, 2004, 12 pages.
U.S. Appl. No. 10/969,301, Notice of Allowance, mailed Aug. 3, 2010, 6 pages.
U.S. Appl. No. 10/969,301, Patent Board Decision, mailed Mar. 24, 2010, 10 pages.
U.S. Appl. No. 10/969,301, Rely Brief, filed Nov. 18, 2008, 6 pages.
U.S. Appl. No. 10/969,301, Examiner's Answer to Appeal Brief, dated Sep. 18, 2008, 24 pages.
U.S. Appl. No. 10/969,301, Appeal Brief, dated Jun. 25, 2008, 22 pages.
U.S. Appl. No. 10/969,301, Final Rejection, dated Sep. 25, 2007, 10 pages.
U.S. Appl. No. 10/969,301, Amendment, dated Jun. 11, 2007, 12 pages.
U.S. Appl. No. 10/969,301, Non-Final Rejection, dated Mar. 9, 2007, 10 pages.

* cited by examiner

ADD/REMOVE MEMORY PRESSURE PER OBJECT

BACKGROUND

Efficient memory management, including implementation timing and scope, in a managed execution environment depends upon at least a knowledge of memory allocation for objects corresponding to a given application, program, function, or other assemblage of programmable and executable code.

SUMMARY

Efficient memory management for execution of a managed object may be influenced by an amount of native memory and managed heap associated with the managed object.

DESCRIPTION OF THE DRAWINGS

Technologies for adding and removing memory pressure for objects are presently described in accordance with the following figures.

DETAILED DESCRIPTION

Memory management configuration, in the form of adding and removing memory pressure for objects, is described herein. More particularly, the description herein pertains to associating a managed object with native memory pressure that the managed object is to add. "Memory pressure," as used herein, may refer to the consumption, both intended and actualized, of memory in accordance with execution of an application, program, function, or other assemblage of programmable and executable code. Further, "native memory" and "unmanaged memory" may be used interchangeably in the present description.

Figure 1:
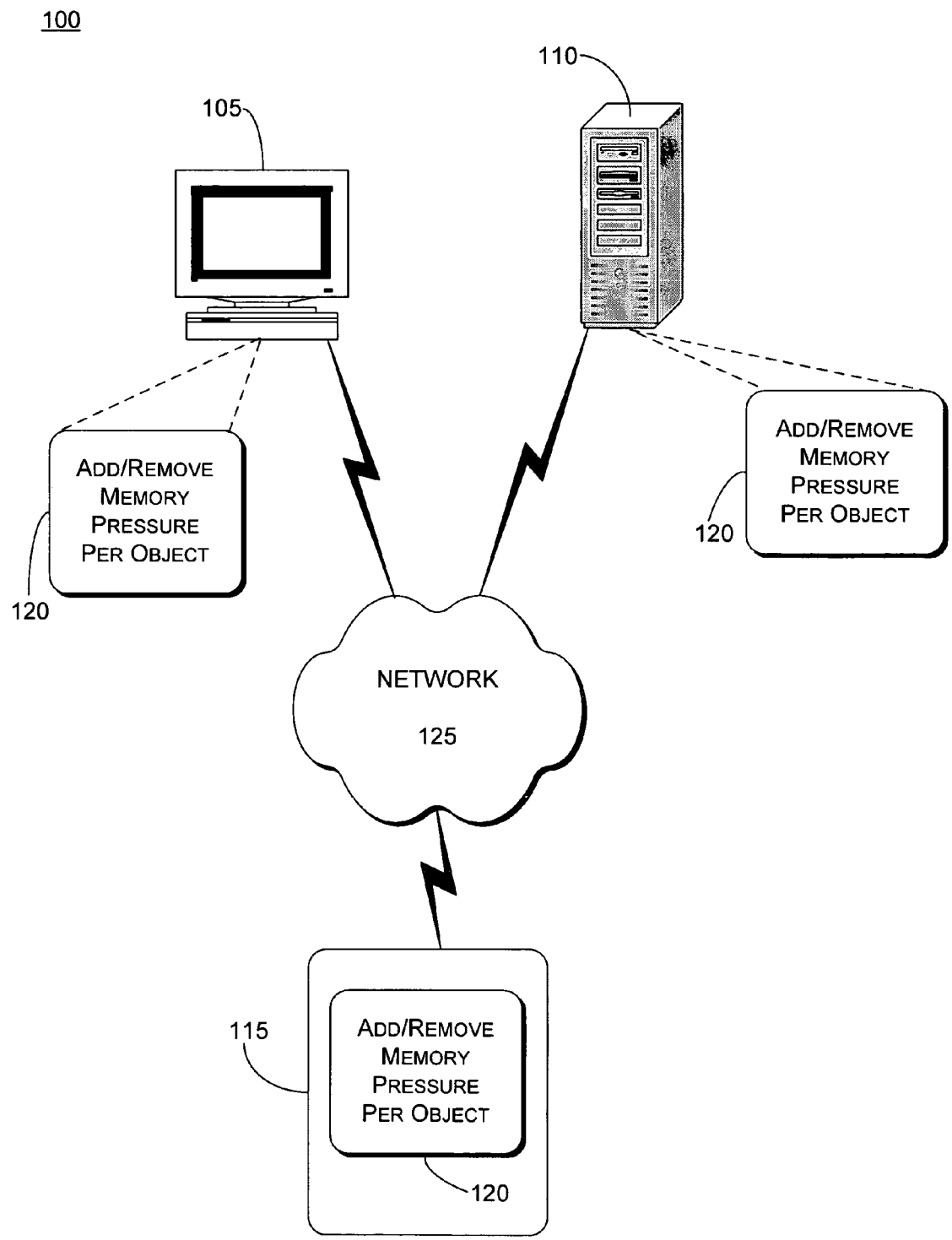
FIG. 1 shows devices communicating over a network, with the devices implementing example technologies for adding and removing memory pressure for objects.

FIG. 1 shows example network environment 100 in which technologies 120 for adding and removing memory pressure for objects may be implemented. However, implementation of such technologies 120, according to at least one example, is not limited to network environments. Such technologies 120 may include, but are not limited to, tools, methodologies, and systems, for adding and removing memory pressure for objects. Regardless, in FIG. 1, client device 105, server device 110, and "other" device 115 may be communicatively coupled to one another via network 125; and, further, at least one of client device 105, server device 110, and "other" device 115 may be capable of implementing technologies 120 for adding and removing memory pressure for objects, as described herein.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115 in accordance with at least one implementation of technologies 120 for adding and removing memory pressure for objects. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may be any device that is a content source, and client device 105 may be any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may be any further device that is capable of implementing technologies 120 for adding and removing memory pressure for objects according to one or more of the examples described herein. That is, "other" device 115 may be a software-enabled computing or processing device that is capable of implementing technologies 120 for adding and removing memory pressure for objects associated with at least portions of an application, program, function, or other assemblage of programmable and executable code in at least a managed execution environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as 802.11 system; a personal area network (i.e., PAN), such as Bluetooth.

Computer architecture in at least one of devices 105, 110, and 115 has typically defined computing platforms in terms of hardware and software. Software for computing devices may be categorized into groups, based on function, which include: a hardware abstraction layer (alternatively referred to as a "HAL"), an operating system (alternatively referred to as "OS"), and applications.

A runtime execution environment may refer to an isolated space, between the OS and an application, in which the application may execute specific tasks on at least one of processing device 105, 110, or 105. More particularly, the runtime execution environment is intended to enhance the reliability of the execution of applications on a growing range of processing devices including servers, desktop computers, laptop computers, mobile processing devices, set-top boxes, and gaming consoles by providing a layer of abstraction and services for an application running on such processing devices, and further providing the application with capabilities including memory management and configuration thereof.

A runtime execution environment may serve as at least one of an application programming and application execution platform.

As an application programming platform, a runtime execution environment may compile targeted applications, which may be written in one of multiple computing languages, into an intermediate language (hereafter "IL"). IL is typically independent of the platform and the central processing unit (hereafter "CPU") executes IL. In fact, IL is a higher level language than many CPU machine languages.

As an application execution platform, a runtime execution environment may interpret compiled IL into native machine instructions. A runtime execution environment may utilize either an interpreter or a "just-in-time" (hereafter "JIT") compiler to execute such instructions.

Compiled native machine instructions may then be directly executed by the CPU. Since IL is CPU-independent, IL may execute on a CPU platform as long as the OS running on that CPU platform hosts an appropriate runtime execution environment. Examples of runtime environments, to which memory management configuration 120 may pertain, include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine. However, such listing provides examples only. The example implementations are not limited to just these managed execution environments. Further, the example implementations are not just limited to managed execution environments, for one or more examples may be implemented within testing environments and/or unmanaged execution environments.

An application compiled into IL may be referred to as "managed code," and therefore a runtime execution environment may be alternatively referred to as a "managed execution environment." Portions of managed code may be referred to as a "managed image." Code that does not utilize a runtime execution environment to execute may be referred to as native code applications.

Figure 2:
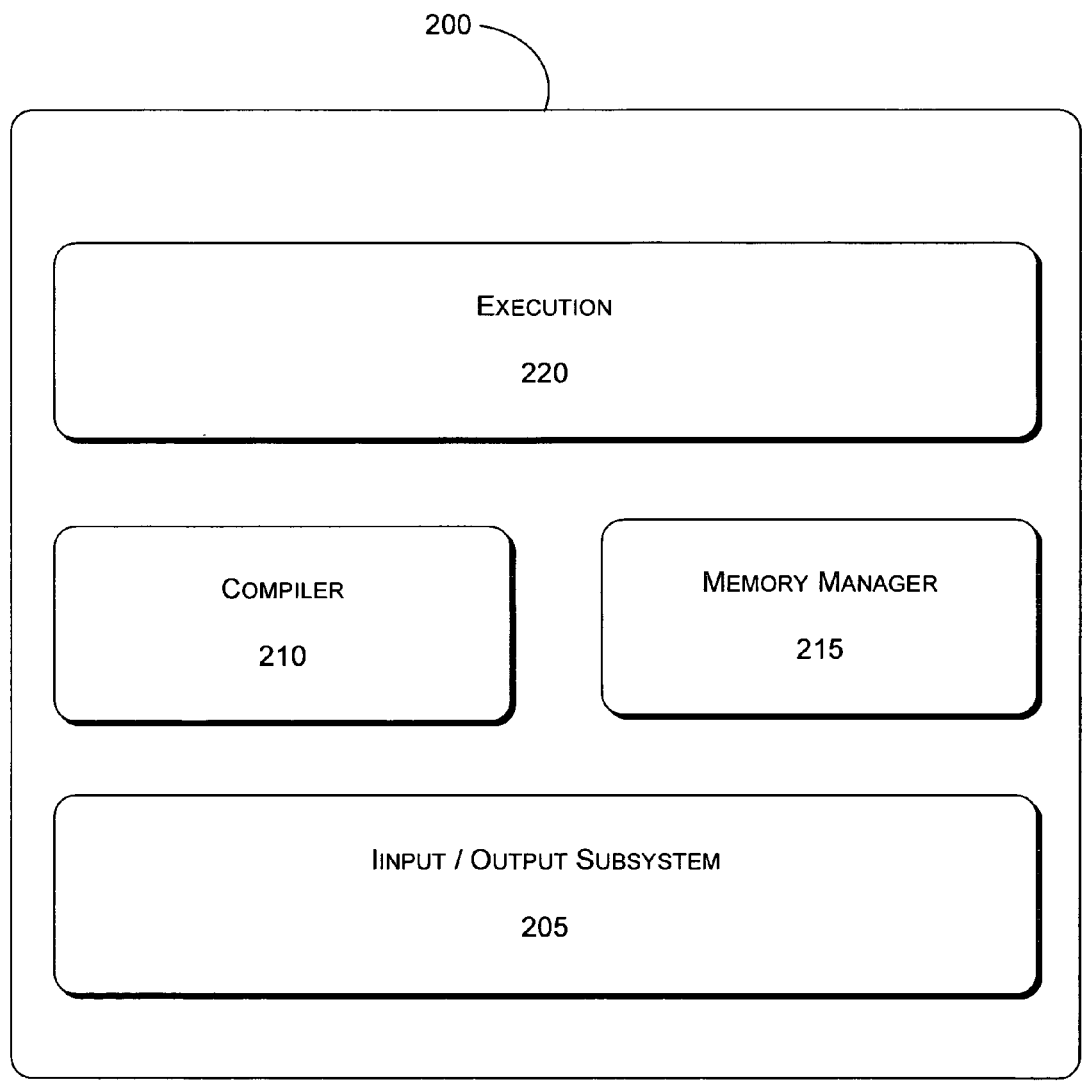
FIG. 2 shows an example of an execution environment for implementing example technologies for adding and removing memory pressure for objects.

FIG. 2 shows an example of runtime execution environment 200 in which examples of technologies 120 for adding and removing memory pressure for objects (see FIG. 1) may be implemented.

According to at least one example implementation, runtime execution environment 200 may facilitate execution of managed code for a computing device platform. Managed code may be considered to be part of a core set of application-development technologies, and may further be regarded as code that is compiled for execution on runtime execution environment 200 to provide a corresponding service to the computing device platform. In addition, runtime execution environment 200 may translate managed code at an interpretive level into instructions that may be proxied and then executed by a processor. A framework for runtime execution environment 200 may also provide class libraries, which may be regarded as software building blocks for managed applications.

According to a further example implementation, runtime execution environment 200 may provide at least partial functionality that may otherwise be expected from a kernel, which may or may not be lacking from a computing device platform depending upon resource constraints for the particular one of device 105, 110, and 115. Thus, at least one example of runtime execution environment 200 may implement the following: input/output (hereafter "I/O") routine management, memory management, administration, and service routine management. Thus, runtime execution environment 200 may include I/O component 205, at least one memory management module 215, compiler 210, and execution component 220. These components, which are to be described in further detail below, are provided as examples only; that is, the examples are not intended to be limiting to any particular implementation, and no such inference should be made. Further, the components may be implemented in examples of runtime execution environment 200 in various combinations and configurations thereof.

I/O component 205 of runtime execution environment 200 may provide asynchronous access to data sources (i.e., processor and peripherals) associated with the computing device platform. More particularly, I/O component 205 may provide runtime execution environment 200 with robust system throughput and further streamline performance of code from which an I/O request originates.

Compiler 210 may refer to a module within runtime execution environment 200 that serves to receive at least a portion of an application, program, method, function, or other assemblage of programmable and executable code for compilation and execution within runtime execution environment 200. Further, in accordance with at least one example implementation of technologies 120 for adding and removing memory pressure for objects, compiler 210 may determine or control certain characteristics and behaviors of the application, program, method, function, or other assemblage of programmable and executable code within runtime execution environment 200 at compile time, initial runtime, or at any time thereafter during execution of an application.

Memory management module 215 may be regarded as a "garbage collector." Garbage collection (alternatively referred to, hereafter, as "GC") may be regarded as a robust feature of managed code execution environments by which an object is freed (i.e., de-allocated) if an object is no longer used by any applications, upon a sweep or scan of a memory heap. In at least one example of memory management module 215, a sweep of free memory heap may be implemented as a linear search. Such implementation may be well-suited for an example of a computing device platform for which memory size is constrained and for which a delay in completion of a sweep may be perceived by a user of a corresponding device.

According to at least one example of technologies 120 for adding and removing memory pressure for objects associated with at least portions of an application, program, function, or other assemblage of programmable and executable code, memory management module 215 may collect managed objects based on the amount of memory allocated to the managed object. Thus, by such collection strategy, memory management module 215 may implement garbage collection (i.e., clean up resources) for a managed object having more memory allocated thereto before implementing garbage collection for resources corresponding to a managed object having less memory allocated thereto in order to free up more memory. The aforementioned collection strategy may be implemented in an effort to hold down a number of garbage collection cycles, which may be beneficial since garbage collection implementations consume resources and cause other programs to experience execution delays.

Further functions implemented by memory management module 215 may include: managing one or more contiguous blocks of finite volatile RAM (i.e., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Execution component 220 may enable execution of managed code for the computing device platform. Execution component 220 may be regarded as the environment in which execution of the code of the application is implemented, and in which runtime services (e.g., device access and memory management) may be provided.

Figure 3:
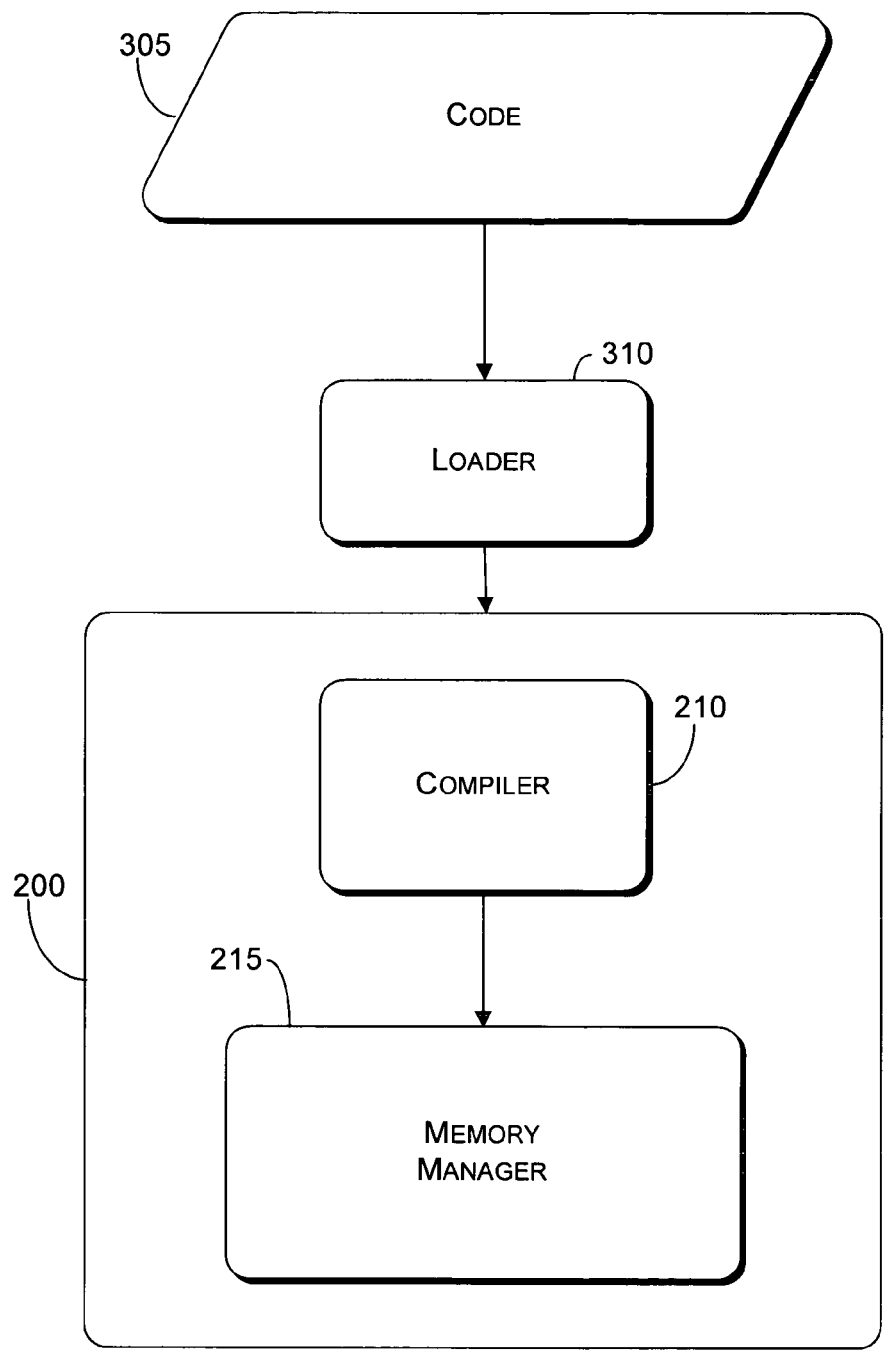
FIG. 3 shows an example data flow in accordance with an example for adding and removing memory pressure for objects.

FIG. 3 shows an example data flow in accordance with example implementations of technologies 120 for adding and removing memory pressure for objects associated with at least portions of an application, program, function, or other assemblages of programmable and executable code in at least a managed execution environment (see FIG. 1).

Executable code 305 may refer to at least a portion of an application, program, method, function, or other assemblage of programmable and executable code that is intended for execution in runtime execution environment 200 on any of devices 105, 110, and 115.

Loader 310 may refer to an assembly manager that may be invoked to locate and read assemblies as needed. Thus, loader 310 may garner executable code 305 for loading into runtime execution environment 200, effectively serving as an entry point for executable code 305 to runtime execution environment 200. Loader 310 may be disposed in an unmanaged execution environment (i.e., OS), although at least one example of runtime execution environment 200 may include loader 310 therein.

Compiler 210 (e.g., JIT compiler) may compile executable code 305, received from loader 310 into IL. Thus, compiler 210 may glean from executable code 305 characteristics including memory allocation requirements, effectively serving as a repository for the data, specifications, and/or parameters related to execution of code 305 within runtime execution environment 200. Thus, compiler 210 may configure memory management module 215 for the execution of executable code 305 in runtime execution environment 200 based on type data or other specifications or parameters associated with executable code 305.

For example, compiler 210 may determine whether executable code 305 requires an allocation of unmanaged memory for execution thereof, in addition to a required allocation of managed memory heap. That is, memory use for execution of executable code 305 may include at least a portion of a managed memory heap as well as an allocation of unmanaged memory (i.e., outside of runtime execution environment 200). Thus, compiler 210 may determine managed heap and unmanaged memory allocations for executable code 305 for execution in runtime execution environment 200.

Memory management module 215 may implement "concurrent GC" functionality to allow managed threads to continue to run during a sweep or scan of a memory heap. That is, during de-allocation, concurrent GC may allow allocation to continue in parallel. Concurrent GC functionality (alternatively referred to herein as "concurrent GC") may be suitable for an interactive or GUI (graphical user interface)-based application. Alternatively, memory management module 215 may implement "work station garbage collector" (i.e., WksGC) functionalities to enable garbage collection concurrent with execution of executable code 305 (i.e., enabling concurrent de-allocation and allocation). Further still, memory management module 215 may implement "server garbage collector" (i.e., SvrGC) functionality, which may be suitable for implementation when e.g., two or more processors host runtime execution environment 200 in which execution of executable code 305 is hosted. Thus, based on various specifications or parameters associated with executable code 305, memory management component 215 may enable or disable memory management functionalities when memory allocated for execution of executable code 305 is divided into heaps assigned to a particular processor and is further collected in parallel by plural processors.

More particularly, based on managed and unmanaged memory allocations for executable code 305 for execution in runtime execution environment 200, memory management component 215 may implement memory management (e.g., GC) strategies. For example, based on the size of managed and unmanaged memory allocations for execution code 305 in runtime execution environment 200, memory management component 215 may prudently time the occurrences and scope of a sweep or scan of a memory heap, thus rendering efficient usage of device resources. It should be noted that the references to allocations and requirements are not limiting. Allocations and/or requirements for native memory and managed heap may be approximations or threshold values, and are not intended confine particular objects to only an exact allocation or requirement value.

Figure 4:
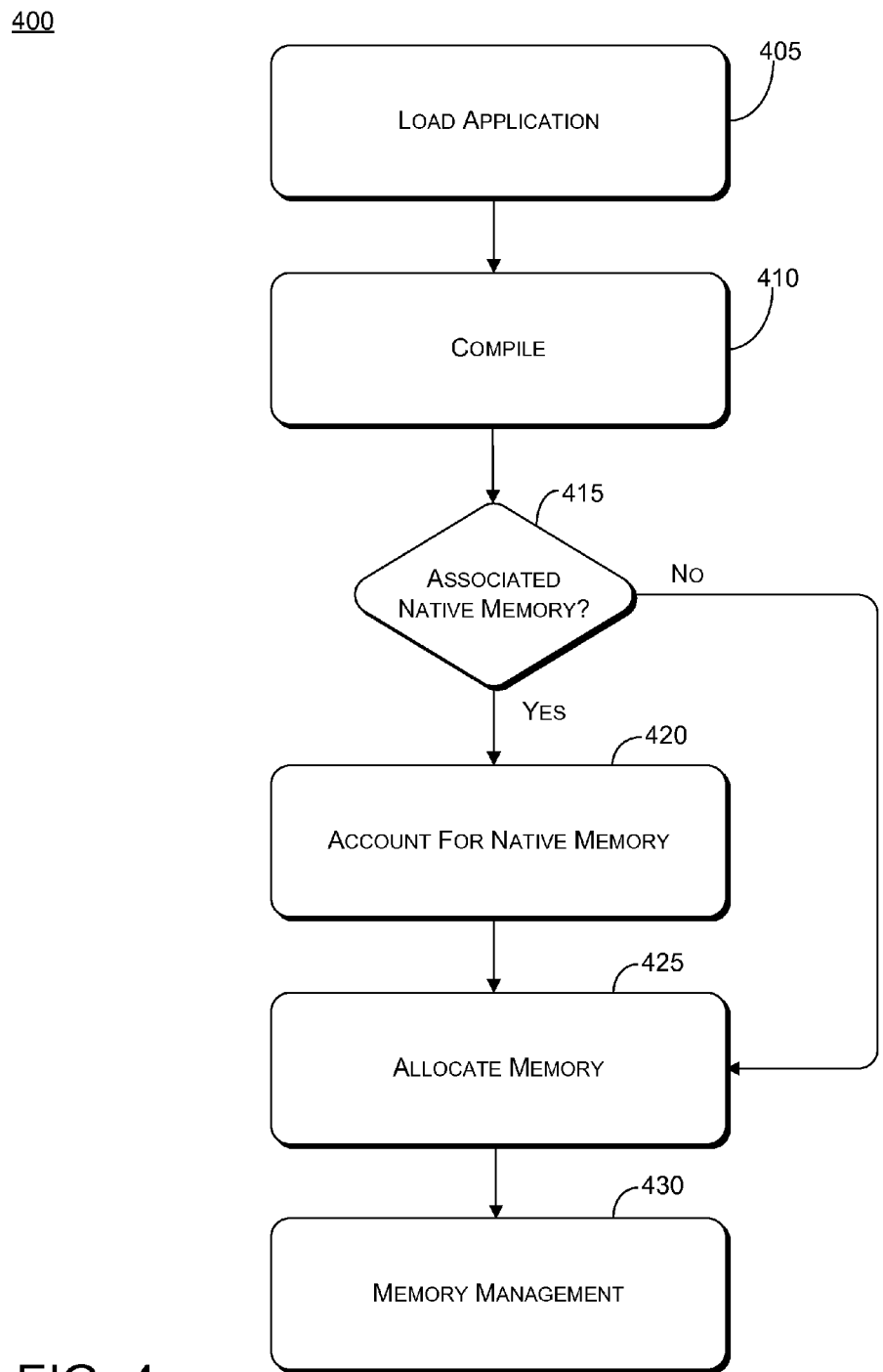
FIG. 4 shows an example processing flow in accordance with an example implementation of adding and removing memory pressure for objects.

FIG. 4 shows example processing flow 400 corresponding to at least one example implementation of technologies 120 for adding and removing memory pressure for objects associated with at least portions of an application, program, function, or other assemblages of programmable and executable code in at least a managed execution environment (see FIG. 1). Example processing flow 400 is described below with references to features from FIGS. 1-3, although such implementations are provided only as examples and are not intended to be construed in any limiting manner.

Block 405 may refer to executable code 305 being loaded into runtime execution environment 200 by loader 310.

Block 410 may refer to compiler 210 compiling at least portions of an application, program, function, or other assemblages of code to which executable code 305 correspond. More particularly, the compiling may be executed in accordance with a request for allocation of a managed object for execution of at least portions of an application, program, function, or other assemblages of programmable and executable code in managed execution environment 200.

Determination 415 may refer to compiler 210 determining, for at least a particular object of compiled code 305, whether there exists an unmanaged memory allocation requirement for execution of executable code 305.

Block 420, upon positive determination 415, may refer to compiler 210 making an account for the amount of native memory required by at least the particular object of compiled code 305.

Block 425, subsequent to the accounting at block 420 as well as, alternatively, negative determination 415, may refer to compiler 210 making an account for the amount of managed memory required by at least the particular object of compiled code 305.

In the event that execution of block 425 occurs subsequent to negative determination 415, block 425 includes only an allocation of a portion of managed heap. Alternatively, in the event that execution of block 425 occurs subsequent to that of block 420, block 425 includes both an allocation of a portion of managed heap and an allocation of a portion of unmanaged memory, both for the execution of compiled code 305.

Block 430 may refer to memory management module 215, i.e., GC, being implemented in accordance with strategies or policies deemed appropriate by compiler 210 based on the allocation of unmanaged memory and/or managed heap. That is, the aforementioned allocation may significantly influence the schedule and scope of memory management implementation for at least compiled object 305, since such strategies and policies attempt to pace the rate of garbage collection to keep memory consumption and overhead in good balance. Thus, as examples, memory management 430 may include implementing garbage collection of managed objects having only managed heap associated therewith before implementing garbage collection of managed objects having managed heap and native memory associated therewith; alternatively, memory management 430 may include implementing garbage collection of a managed object having a lesser amount of native memory associated therewith before implementing garbage collection of a managed object having a greater amount of native memory associated therewith. Such memory management strategies may vary according to alternative implementations, and therefore the above examples are not limiting in any manner.

Further, alternative examples of processing flow 400 may include compiler 210, memory management component 215, or even an administrative component (not shown) configuring memory management implementations within runtime execution environment 200 based on specifications or parameters in addition to the aforementioned allocations of unmanaged memory and/or managed heap. Examples of such specifications and/or parameters may include, but are not limited to scalability, performance, resource availability (e.g., memory, processors, running instances, and power), latency, and processing time.

Block 430, according to various memory management implementations, may include memory management component 215 discounting any portion of native memory of a managed object that has been de-allocated.

The description above, pertaining to FIGS. 1-4, memory management within a runtime execution environment may be configured in accordance with data associated with executable code loaded and compiled therein. However, the example limitations described herein are not limited to just configuration of memory management. Rather, further processing modules related to runtime execution environment 200 may be configured (i.e., without recompiling of executable code 305) upon loading executable code 305 within runtime execution environment 200 and without touching or otherwise affecting executable code 305, based upon any of the aforementioned specifications or parameters.

The computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method, comprising:
   compiling code;
   requesting allocation of a managed object from the compiled code;
   determining, based on the requested allocation, a native memory requirement with the managed object;
   allocating a portion of native memory based on the native memory requirement associated with the managed object;
   allocating a portion of managed memory based on a managed memory requirement associated with the managed object; and
   implementing a memory management strategy based on the allocation of native memory associated with the managed object and the allocation of managed memory associated with the managed object, comprising wherein the memory management strategy comprises garbage collection of first managed objects that have only managed memory associated therewith is performed before garbage collection of second managed objects that have both managed memory and native memory associated therewith, wherein during de-allocation, garbage collection allows allocation of native memory and managed memory to continue in parallel.

2. A method according to claim 1, further comprising discounting the native memory requirement upon de-allocation of the managed object.

3. A method according to claim 1, wherein the compiling is executed in a managed execution environment.

4. A method according to claim 1, wherein the native memory requirement includes native memory consumed during execution of the managed object in a managed execution environment.

5. The method of claim 1, comprising implementing a memory management strategy wherein garbage collection of managed objects each having less than a threshold amount of native memory associated therewith, is performed before garbage collection of managed objects each having an amount of native memory associated therewith that is more than the threshold amount.

6. At least one computer-readable storage memory having one or more executable instructions that, when executed by one or more processors, cause the one or more processors to:

compile code in a managed execution environment;
associate a required amount of native memory with a managed object resulting from the compiled code;
allocate a portion of native memory based on the required amount of native memory;
allocate a managed heap requirement for the managed object; and
manage memory allocation for the managed object based on the allocation of native memory and the allocation of the managed heap by implementing a memory management strategy wherein garbage collection of first managed objects that have only managed heap associated therewith is performed before garbage collection of second managed objects that have both managed heap and native memory associated therewith, wherein during de-allocation, garbage collection allows allocation of native memory and managed memory to continue in parallel.

7. At least one computer-readable storage memory, according to claim 6, wherein the one or more instructions that cause the one or more processors to manage memory allocation include one or more further instructions to release the required amount of native memory for the managed object when the managed object is de-allocated.

8. At least one computer-readable storage memory, according to claim 6, wherein the one or more instructions that cause the one or more processors to manage memory allocation determine a frequency and scope of memory sweeps during execution of the managed object in the managed execution environment based on the required amount of native memory and the managed heap.

9. The memory of claim 6, comprising instructions that when executed by the one or more processors cause the one or more processors to implement a memory management strategy wherein garbage collection of managed objects each having less than a threshold amount of native memory associated therewith, is performed before garbage collection of managed objects each having an amount of native memory associated therewith that is more than the threshold amount.

10. A system, comprising:
at least one processor and a memory comprising instructions that, when executed by the at least one processor, cause the at least one processor to implement a compiler and a memory manager;
wherein the compiler is configured to: compile at least a portion of executable code, and implement an allocation request for a managed object from the compiled executable code; and
wherein memory manager is configured to: determine an amount of native memory to associate with the managed object, determine an amount of managed heap to associate with the managed object, allocate the determined amount of native memory, allocate the determined amount of managed heap, and implement a memory management strategy based on the allocated amount of native memory and allocated amount of managed heap, wherein the memory manager is configured to implement a memory management strategy wherein garbage collection of first managed objects that have only managed heap associated therewith is performed before garbage collection of second managed objects that have both managed heap and native memory associated therewith, wherein during de-allocation, garbage collection allows allocation of native memory and managed memory to continue in parallel.

11. A system according to claim 10, wherein the memory manager is configured to affect a frequency of a memory sweep based on the amount of native memory and managed heap.

12. A system according to claim 10, wherein the memory manager is configured to affect a scope of a memory sweep based on the amount of native memory and managed heap.

13. The system of claim 10, wherein the memory manager is configured to implement a memory management strategy wherein garbage collection of managed objects each having less than a threshold amount of native memory associated therewith, is performed before garbage collection of managed objects each having an amount of native memory associated therewith that is more than the threshold amount.

* * * * *